(12) United States Patent
Drobnik

(10) Patent No.: US 6,310,792 B1
(45) Date of Patent: Oct. 30, 2001

(54) SHARED PACKAGE FOR VRM AND PROCESSOR UNIT

(75) Inventor: Josef Drobnik, Aurora, IL (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/474,092

(22) Filed: Dec. 29, 1999

(51) Int. Cl.[7] ..................................... H02M 1/00
(52) U.S. Cl. ...................... 363/147; 361/728; 361/820
(58) Field of Search .................. 363/147; 361/728, 361/820

(56) References Cited

U.S. PATENT DOCUMENTS

| | | | |
|---|---|---|---|
| 5,627,413 | * | 5/1997 | Mughir et al. ............... 307/86 |
| 5,648,759 | * | 7/1997 | Miller et al. ............... 340/660 |
| 5,834,856 | * | 10/1998 | Tavallaci et al. ............ 307/64 |
| 5,918,023 | * | 6/1999 | Reeves et al. ............. 395/282 |
| 5,923,682 | * | 7/1999 | Sevyedy ................... 371/40.18 |
| 5,951,665 | * | 9/1999 | Crane, Jr. et al. ........... 710/126 |
| 5,959,848 | * | 9/1999 | Groves et al. .............. 361/809 |
| 6,028,773 | * | 2/2000 | Hundt ..................... 361/760 |
| 6,038,633 | * | 3/2000 | Tavallaci ................. 710/262 |
| 6,051,964 | * | 4/2000 | Brown et al. .............. 323/288 |

* cited by examiner

Primary Examiner—Peter S. Wong
Assistant Examiner—Bao Q. Vu
(74) Attorney, Agent, or Firm—Antonelli, Terry, Stout & Kraus, LLP

(57) ABSTRACT

A component module includes a processor and at least a portion of a voltage regulator module which regulates voltages being supplied to said processor.

17 Claims, 5 Drawing Sheets

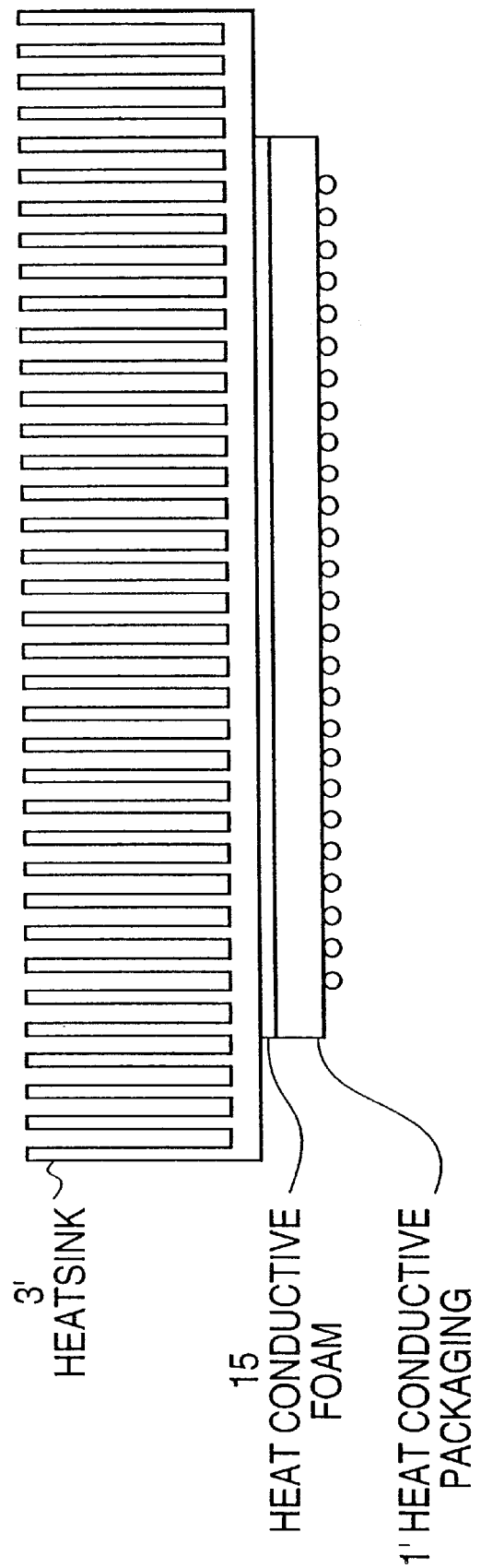

SHARED PACKAGE FOR VRM AND PROCESSOR UNIT

FIELD

The present invention relates to the field of component packaging. In particular, the present invention relates to a common packaging for a processor and at least a portion of a voltage regulator module.

BACKGROUND

With today's processors requiring increased current and slew rates, in order to accommodate the requirement for increased internal frequencies, along with progressing voltage reductions, it is necessary to improve the performance of the voltage regulator modules associated with the respective processors.

Currently, however, steep current prorogation from a voltage regulator module to a processor is limited by the impedance of the connections between the voltage regulator module and the processor. In particular, of utmost concern as a limiting factor of the steep current propogation from the voltage regulator module and the processor is the inductance of the current distribution path therebetween. That is, inductance in the connections between the voltage regulator module and a processor can cut off the rate of change of current therebetween.

In order to reduce the inductance of the current distribution path between the voltage regulator module and the processor, the length of conductors therebetween must be minimized. That is, the actual physical distance between the voltage regulator module and the processor must be minimized, to thereby reduce the inductance in the connections therebetween and thus prevent the rate of change of current from being reduced.

FIG. 1 shows an implementation of a component package and voltage regulator module. The package 1, which includes the processor therein, is mounted on substrate 8 which is secured to the motherboard 9 by sockets 6, fan/heatsink 3 is placed on top of the package 1, and fan 4 is provided above the package 1. Further, the package is held in place by surface mount component 5. Voltage regulator module 2 is not at all a part of package 1, and therefore must be plugged into a receptacle 12 on the motherboard 9.

SUMMARY

According to an embodiment of the present invention, a component module includes a processor and at least a portion of a voltage regulator module which regulates voltages being supplied to said processor.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written disclosure focuses on disclosing example embodiments of this invention, it should be clearly understood that the same is by way of illustration arid example only and the invention is not limited thereto. The spirit and scope of the present invention are limited only by the terms of the appended claims.

The following represents brief descriptions of the drawings, wherein:

FIG. 5 shows an exterior view of an example of the common component package according to one embodiment of the invention.

DETAILED DESCRIPTION

Figure 1:
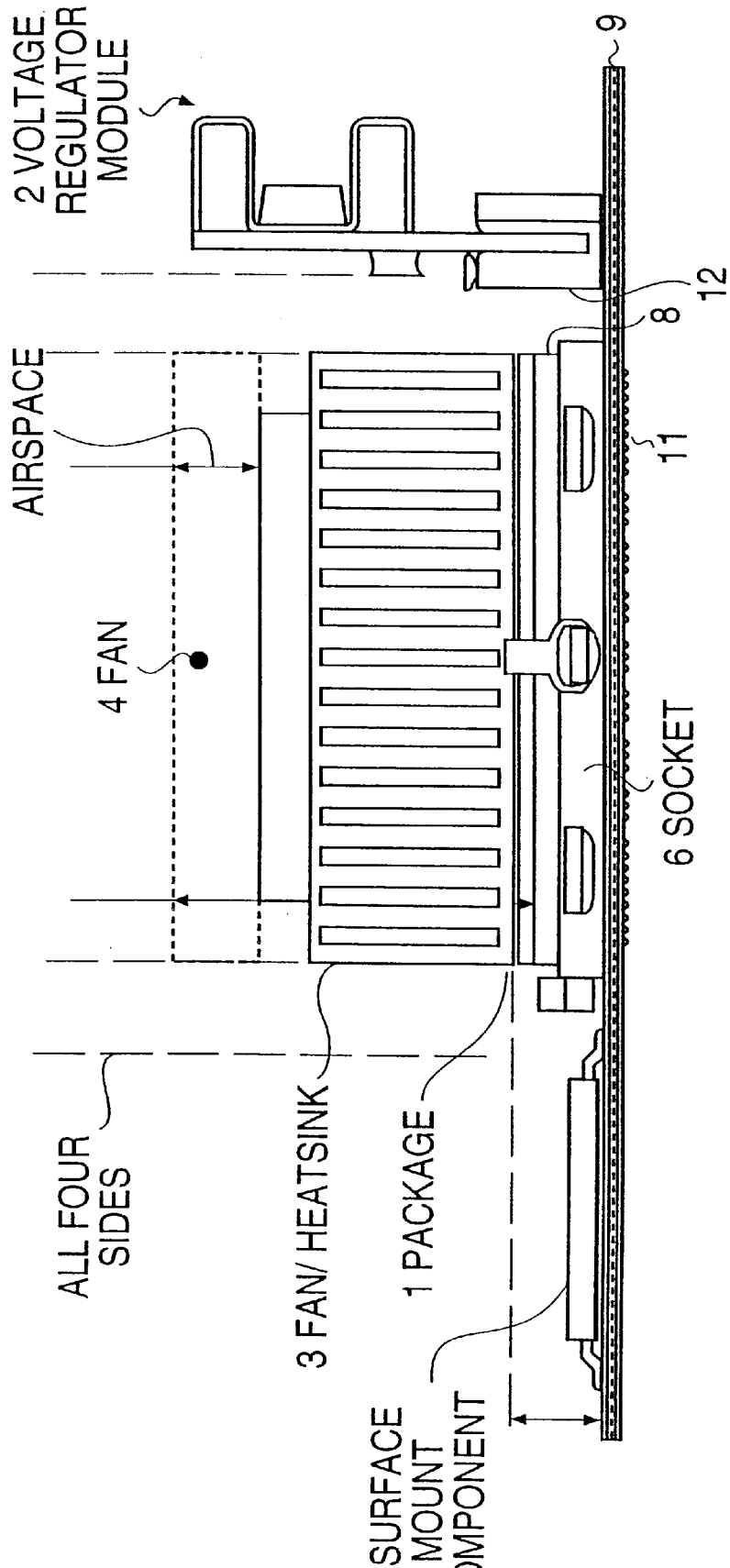
FIG. 1 shows an example of a disadvantageous implementation of a component package and voltage regulator module.

Before beginning a detailed description of the invention, it should be noted that, when appropriate. like reference numerals and characters may be used to designate identical, corresponding or similar components in differing figure drawings. Further, in the detailed description to follow, example embodiments and values may be given, although the present invention is not limited thereto.

Figure 2:
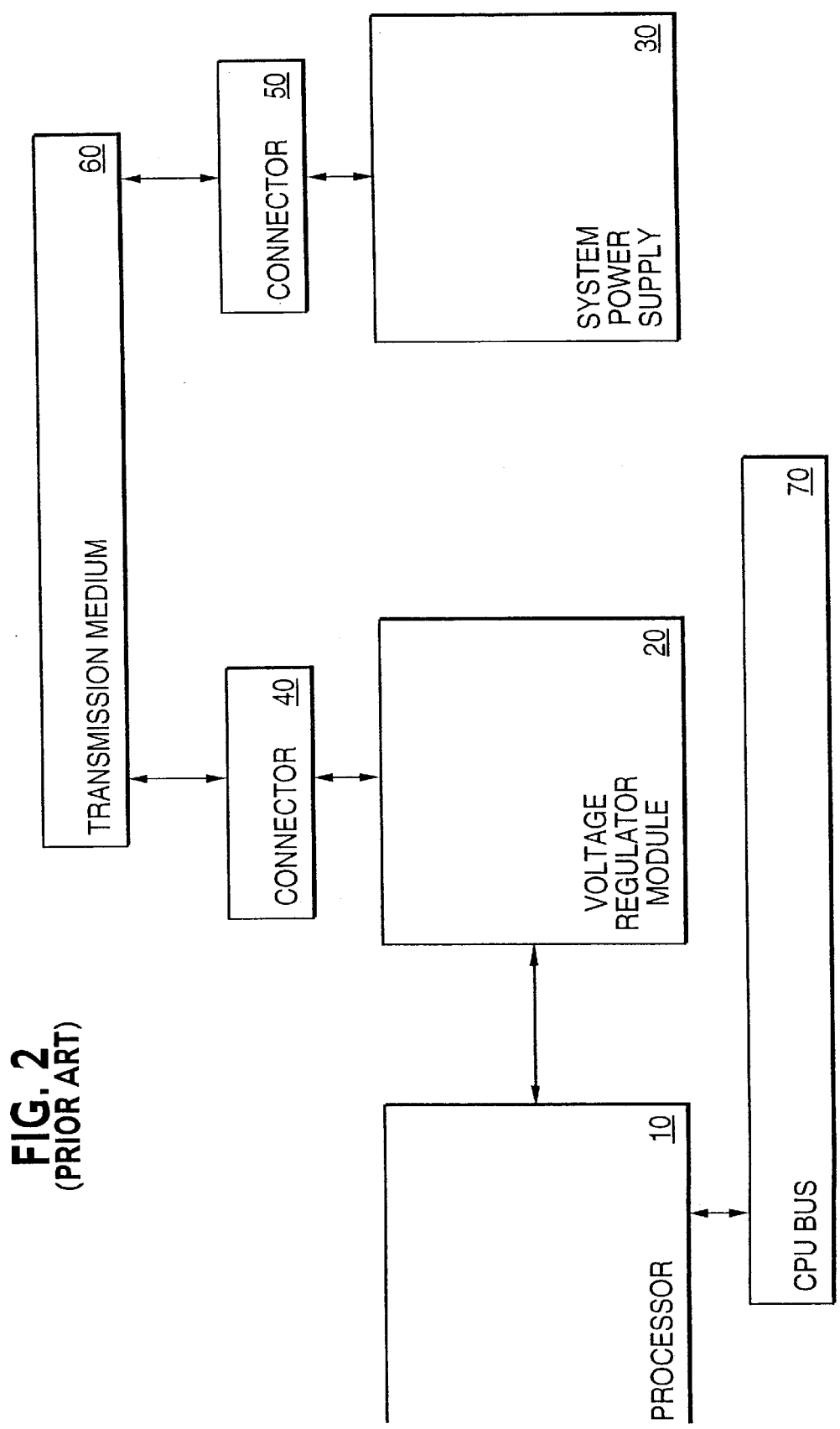
FIG. 2 shows a block diagram of an example of a disadvantageous implementation of a processor and a voltage regulator module.

The block diagram of FIG. 2 illustrates an example block diagram and connection between an a processor module 10 and voltage regulator module 20 in a computer system. The computer system also includes a system power supply 30. The system power supply 30 receives power from a power sources such as a wall socket (not shown) or another power source. The system power supply processes the power received from the power source and transmits the power in a high frequency alternating current (AC) domain on transmission medium 60 which may be an AC bus. The voltage regulator module 20 may be a high frequency AC voltage regulator module which is coupled to the AC bus 60. The high frequency AC voltage regulator module 20 receives power in the AC domain from the AC bus 60 and then regulates the power to a voltage and current level which are appropriate for the processor 10 (and other components). Connectors 40 and 50, which may be contact-less connectors, are provided to respectively connect the voltage regulator module 20 and the system power supply 30 to the AC bus 60. Further, the processor 10 may be coupled to processor unit bus 70 that transmits data signals between the processor 10 and other components (not shown) in the computer system.

However, such a configuration, whereby the voltage regulator module is provided externally of the processor module, requires connections between the voltage regulator module and the processor that are undesirable for the increased current and slew rates desired for contemporary requirements. In particular, inductance in the connections between the voltage regulator module and a processor can reduce the rate of change of current therebetween.

Furthermore, in addition to reducing the physical distance between a processor and a voltage regulator module, and therefore the impedance and inductance therebetween, by commonly packaging a processor and a voltage regulator module, it is desirable to provide a high frequency alternating current voltage regulator module as the voltage regulator module. A high frequency alternating current voltage regulator module regulates a level of current from power in a high frequency alternating current domain in order to improve the reliability of regulation of current to components in the computer system.

Figure 3:
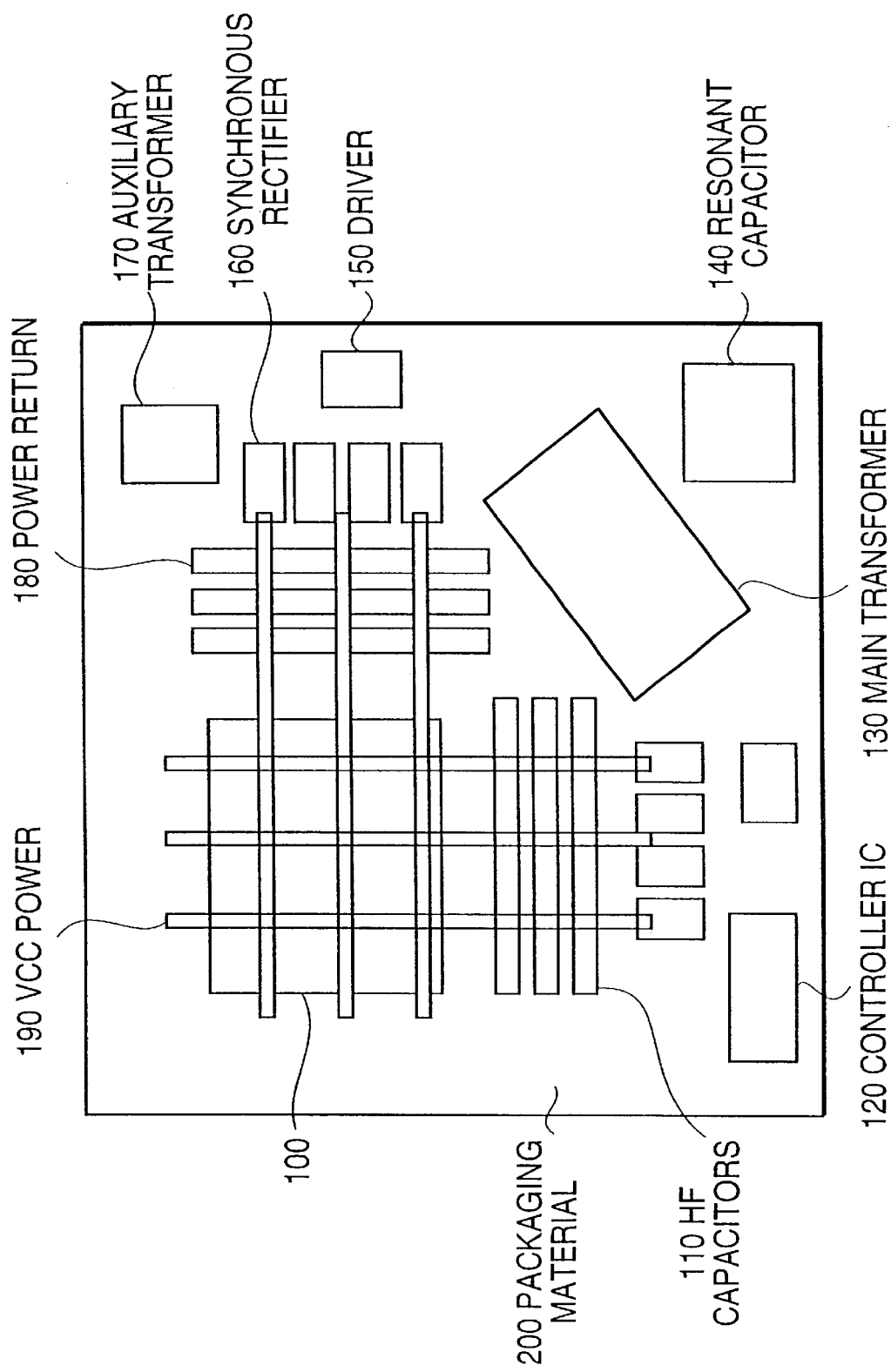
FIG. 3 is an example of a component package according to one example embodiment of the invention.
Figure 4:
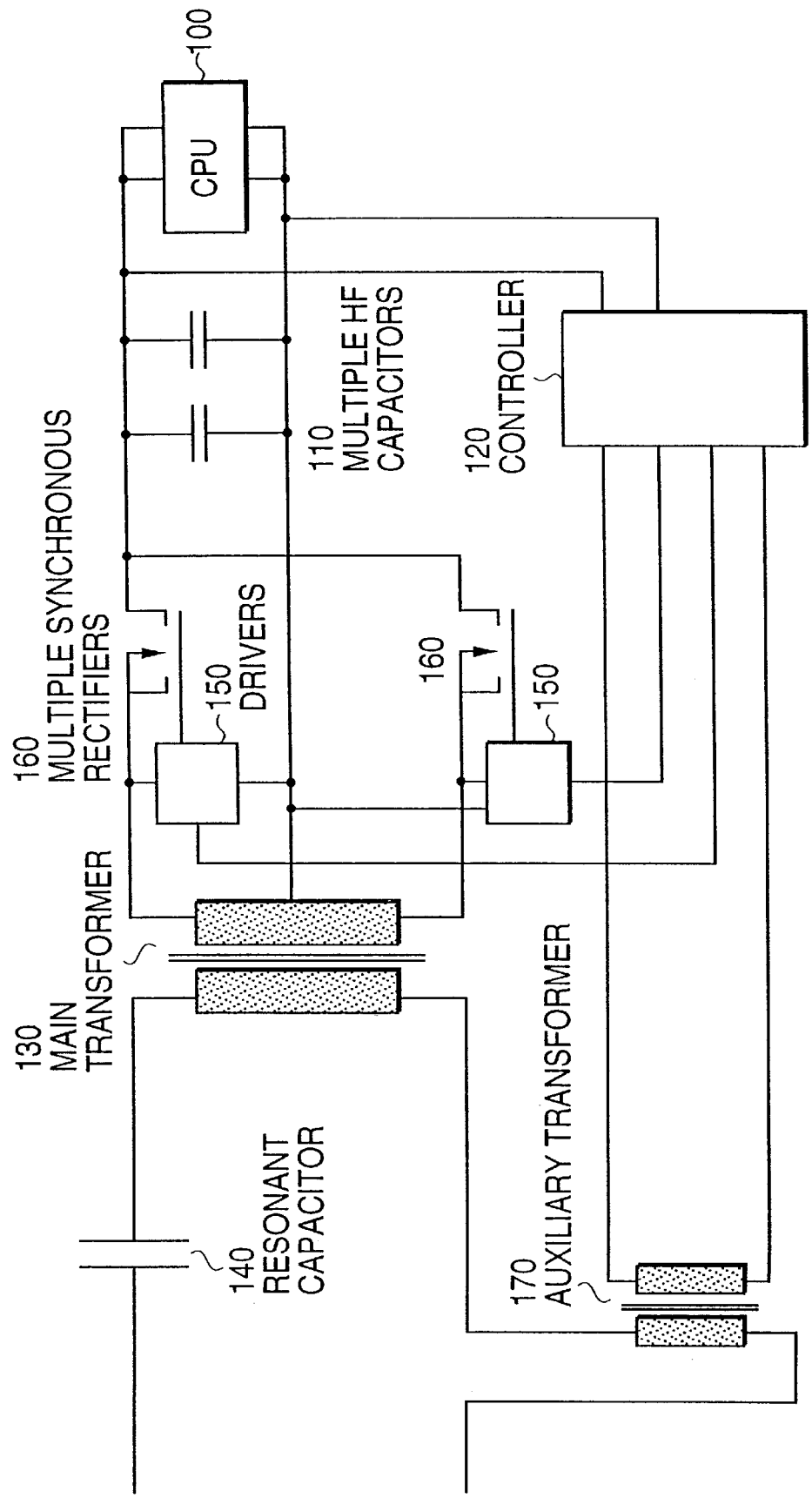
FIG. 4 is a block diagram showing an example of the processor and voltage regulator in a common component package according to the example embodiment of the invention.

Thus, an example of an embodiment of the present invention, shown in block diagram FIG. 3 and circuit diagram FIG. 4, provides a common component module which includes both a processor and a high frequency alternating current voltage regulator module, although the scope of the present invention is not limited to include only high frequency alternating current voltage regulator modules.

The example embodiment of the present invention shown in FIGS. 3 and 4 utilizes a high density interconnect, or any other high density packaging technique, to package a processor together with at least a portion of a voltage regulator module. High density interconnect, which is a Lockheed-Martin proprietary packaging technique, is a packaging technique which allows power density of up to 300 W/in$^3$ for DC/DC conversion. Further high density packaging techniques which allow for an increase in power density would be appropriate for the present invention since high frequency alternating current voltage regulator module power densities may exceed 400 A/in$^3$ for AC/DC conversion.

Furthermore, common packaging techniques are advantageous for the following reasons. First of all, the common packaging of the voltage regulator module and processor 100 significantly reduces the inventory of parts and labor associated with the processor system. For instance, the solder bumps 11 shown in the FIG. 1 disadvantageous arrangement, which can number in the hundreds, are required for the delivery of high current to the processor from the voltage regulator module. However, by providing the processor and at least a portion of the voltage regulator module within the same high density packaging module, the high current is generated within the same module as the processor thus eliminating the need for solder bumps required for delivery of current to the processor. Furthermore, the common high density packaging of the voltage regulator module and processor 100 also eliminates the need for multiple connectors, as well as the associated manufacturing effort to connect the processor and voltage regulator module, which can drive up the costs related to such processor systems.

Further still, the common packaging of the voltage regulator module and processor 100 traverses the problems commonly associated with the upgrading of either component. For instance, if the processor 100 requires a new voltage regulation, the separately disposed voltage regulator module would have to be replaced or upgraded. To that end, it may very well be the case that the processor would not be able to support such a replacement or upgrade of the voltage regulator module. Thus, by commonly packaging the processor and at least a portion of the voltage regulator module, the voltage regulator module is automatically upgraded with the processor by a simple change of the common module, thus requiring a reduced inventory of parts, reduced costs in connection with the processor system, and simplified manufacturing thereof.

Even further still, the common packaging of the voltage regulator module and processor 100 enables the processor system to be reduced in size, which is consistent with the prevalent goal of reducing the size of processors, computers, etc.

The processor 100 and the voltage regulator module (FIGS. 3 and 4) are disposed on packaging material 200 which may be, but is not limited to, a PC board substrate. The processor 100 may be a complex instruction set computer (CISC) microprocessor, a reduced instruction set computing (RISC) microprocessor, a very long instruction word (VLIW) microprocessor, a processor implementing a combination of instruction sets, or other processor device, although the invention is not limited to those listed.

The high frequency alternating current voltage regulator module of the present invention may includes at least a resonant capacitor 140 and a high density transformer 130 acting together as a resonant circuit for use in a high frequency alternating current domain. Synchronous rectifiers 160, driven by drivers 150, may be controlled by controller 120. High frequency capacitors 110 are provided for energy storage. Auxiliary transformer 170 has the dual functions of providing a power supply to controller 120 and regulate the voltage regulator. While an example plan layout of such example embodiment is illustrated in FIG. 3, an example circuit layout is illustrated in FIG. 4.

The voltage regulator module of the present invention, which may be a high frequency alternating current voltage regulator module as set forth above, may be either of a single phase or a multi-phase voltage regulator module. Furthermore, the high frequency alternating current domain includes multiple frequencies, and thus the voltage regulator module of the present invention may also be a multi-frequency and variable voltage regulator module.

As set forth above, by disposing both a processor and at least a portion of a voltage regulator module in a common component module, the physical distance between the components is minimized, thus reducing the inductance therebetween which limits current propagation and further preserving the integrity of signals transmitted therebetween. In addition, rather than the voltage regulator module having its own controller, the present invention may implement control of the voltage regulator by the processor unit silcon, thus providing direct communication between the processor and the voltage regulator module within the common component module.

The example components illustrated in the FIGS. 3 and 4 embodiment may be provided on a common substrate (e.g., PC board) within the common module or may be provided on a plurality of substrates within the common module. Further, the example components may be provided on a common semiconductor integrated circuit die or may be provided on a plurality of dies joined to one or more of the aforementioned substrates.

As a result, the present invention provides a common module package for both a processor and at least a portion of a voltage regulator module in order to accommodate steep current step propagation, which are steep increases in current in a short amount of time, from the voltage regulator module to the processor, which is highly desirable in today's processing environment.

An external view of an example common module package is shown in FIG. 5, which includes the common module package 1', in which both the processor and at least a portion of a voltage regulator module are disposed therein, heat conductive foam 10 placed on a top surface of the package 1', and heatsink 3'disposed upon the heat conductive foam 15. Shown at the bottom of such figure are, for example, solder bumps for allowing interconnection to the common processor unit/voltage regulator module (PU/VRM) unit using, for example, solder bump interconnection pads.

This concludes the description of the example embodiments. Although the present invention has been described with reference to illustrative embodiments thereof, it should be understood that numerous other modifications and embodiments can be devised by those skilled in the art that will fall within the scope and spirit of the principals of the invention. More particularly, reasonable variations and modifications are possible in the component parts and/or arrangements of the subject combination arrangement within the scope of the foregoing disclosure, the drawings and the appended claims without department from these spirit of the invention. In addition to variations and modifications in the component parts and/or arrangements, alternative uses will also be apparent to those skilled in the art.

What is claimed:

1. A component module, comprising:

a packaging material within said module;

a processor mounted on said packaging material; and at least a portion of a voltage regulator module mounted on said packaging material which regulates voltages being supplied to said processor, said component module providing common packaging for said processor and said portion of said voltage regulator module and utilizing high density packaging technique.

2. A component module according to claim 1, wherein said component module is a semiconductor integrated circuit.

3. A component module according to claim 1, wherein said component module is a processor component package.

4. A component module according to claim 3, wherein said processor component package supplies processor capabilities to a motherboard.

5. A component module according to claim 1, wherein said voltage regulator module is a high frequency alternating current voltage regulator module.

6. A component module according to claim 5, wherein power is transmitted to said high frequency alternating current voltage regulator module in a high frequency alternating current domain from a power supply of an electronic system.

7. A component module according to claim 5, wherein said high frequency alternating current voltage regulator module includes a high density transformer.

8. A component module according to claim 5, wherein said high frequency alternating current voltage regulator module includes at least one high density capacitor.

9. A component module according to claim 5, wherein said high frequency alternating current voltage regulator module includes at least one synchronous rectifier implemented by a silicon integrated circuit.

10. A component module according to claim 1, wherein said processor and said voltage regulator module perform direct communication within said component package.

11. A component module according to claim 1, wherein said processor is utilized to control functions of said voltage regulator module.

12. A semiconductor integrated circuit package, comprising:

a packaging material within said package;

a processor mounted on said packaging material; and a voltage regulator module mounted on said packaging material which regulates voltages being supplied to said processor;

wherein said semiconductor integrated circuit package supplies processor capabilities;

said package providing a common package for said processor and said voltage regulator module and utilizing high density packaging technique.

13. A semiconductor integrated circuit package, comprising:

a packaging material within said package;

a processor mounted on said packaging material; and a high frequency alternating current voltage regulator module mounted on said packaging material which regulates voltages being supplied to said processor;

wherein said semiconductor integrated circuit package supplies processor capabilities to a motherboard;

said package providing a common package for said processor and said high frequency alternating current voltage regulator module and utilizing high density packaging technique.

14. A semiconductor integrated circuit package according to claim 13, wherein power is transmitted to said high frequency alternating current voltage regulator module in a high frequency alternating current domain from a power supply of an electronic system.

15. A component module comprising:

a processor; and at least a portion of the voltage regulator module which regulates voltages being supplied to said processor;

wherein dynamic communication between said processor and said voltage regulator module when said voltage regulator module dynamically adjusts the output voltage thereof based upon a request by said processor.

16. A semiconductor integrated circuit package, comprising:

a processor; and a voltage regulator module which regulates voltages being supplied to said processor;

wherein said semiconductor integrated circuit package supplies processor capabilities;

wherein dynamic communication between said processor and said voltage regulator module when said voltage regulator module dynamically adjusts the output voltage thereof based upon a request by said processor.

17. A semiconductor integrated circuit package, comprising:

a processor; and a high frequency alternating current voltage regulator module which regulates voltages being supplied to said processor;

wherein said semiconductor integrated circuit package supplies processor capabilities to a motherboard;

wherein dynamic communication between said processor and said voltage regulator module when said voltage regulator module dynamically adjusts the output voltage thereof based upon a request by said processor.

* * * * *